United States Patent

Keister et al.

[15] 3,666,967

[45] May 30, 1972

[54] SELF-DESTRUCT ALUMINUM-TUNGSTIC OXIDE FILMS

[72] Inventors: Frank Z. Keister, Culver City; Gary S. Smolker, Los Angeles, both of Calif.

[73] Assignee: The United States of America as represented by the Secretary of the Navy

[22] Filed: May 12, 1971

[21] Appl. No.: 97,347

[52] U.S. Cl. ..............................307/202, 307/298, 307/299, 307/303, 149/37, 149/109, 102/28 R, 102/70.2 R, 174/68.5, 338/308, 317/101 CC

[51] Int. Cl. ..........................................................H02h 7/20

[58] Field of Search .....................317/101 CE, 101 CC, 258; 174/68.5; 307/202, 298, 299, 303; 338/308; 149/37, 109; 102/28 R, 70.2 R

[56] References Cited

UNITED STATES PATENTS

| | | | |
|---|---|---|---|
| 3,286,137 | 11/1966 | Luescher et al. | 307/202 X |
| 3,336,514 | 8/1967 | Hiatt et al. | 307/298 X |
| 3,394,218 | 7/1968 | Foudriat | 174/68.5 |

*Primary Examiner*—John S. Heyman
*Attorney*—R. S. Sciascia and H. H. Losche

[57] ABSTRACT

A multilayer thin film circuit board having thin film layers of the thermite reaction class, such as tungstic oxide and aluminum materials, coupled to a switched voltage source to be switched in circuit to cause ignition of the thermite layer and cause destruction of the film circuit.

4 Claims, 3 Drawing Figures

INVENTOR.
FRANK Z. KEISTER &
GARY S. SMOLKER
BY
H. H. Losche
ATTORNEY

SELF-DESTRUCT ALUMINUM-TUNGSTIC OXIDE FILMS

BACKGROUND OF THE INVENTION

This invention relates to thin film circuit modules and more particularly to self-destruct circuit board modules which are circuited to cause ignition of a thermite layer at the choice of an operator to destroy the circuit before falling into enemy hands.

While chemical and metallurgical elements have been used extensively to provide combustible materials ignitable by an electric current, these combustible materials are usually made in a pyrotechnic package which is placed adjacent to a circuit board assembly to destroy same when it is desirable or expedient to do so. Such pyrotechnic packages could not conveniently be put into the circuit module container and were usually placed alongside to produce sufficiently high heat to destroy the circuitry. These packages were too bulky for most applications and especially in aircraft equipment where instrument panels and control centers are already overloaded. Also attempts have been made in the past to produce metal oxide-aluminum films in such a way that they would react violently and exothermically. Film combinations that have been attempted include:

$$Al + Fe_2O_3;\ Al + MnO_2;\ \text{and}\ Al + CrO_2.$$

However, none of these combinations were really successful for destructible thin film modules.

SUMMARY OF THE INVENTION

In the present invention a thin film circuit is produced by vacuum deposition of various circuit and insulating films thereon including the vacuum deposition of tungstic oxide and aluminum to provide a thermite reaction. The tungstic oxide and aluminum film will produce a high heat upon the application of a voltage across it. Thus, a circuit is established from a charged capacitor through a control switch to the thermite film lying adjacent the film circuit to allow the thin film to be destroyed by closing the switch between the thermite film and the charged capacitor. Accordingly, it is a general object of this invention to provide a self-destruct thin film circuit module that is effectively destroyed by underlying the thin film circuit with thin film layers of tungstic oxide and aluminum to cause thermite reaction by an electrical current.

BRIEF DESCRIPTION OF THE DRAWINGS

These and other objects and the advantages, features, and uses will become more apparent to those skilled in the art as a more detailed description proceeds when taken along with the accompanying drawings in which.

DESCRIPTION OF THE PREFERRED EMBODIMENT

Figure 1:
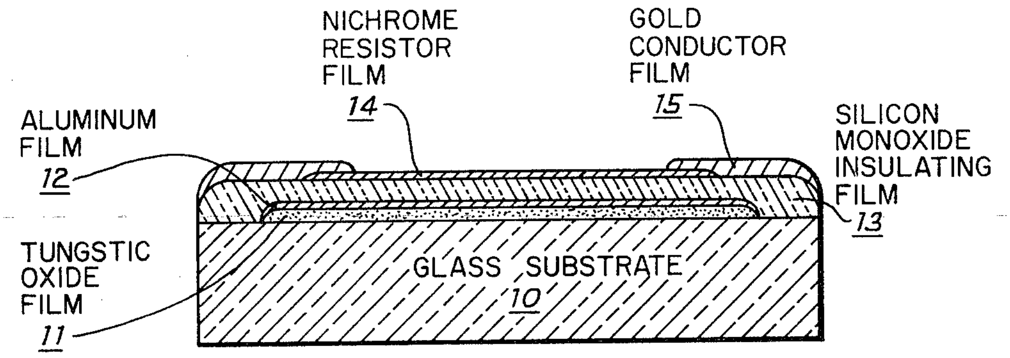
FIG. 1 is a cross-sectional view of a thin film circuit module with the destructive film thereon.
Figure 2:
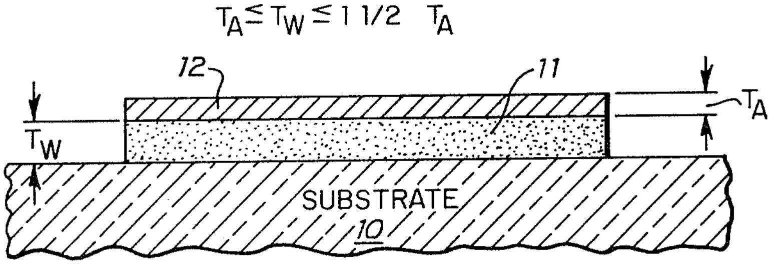
FIG. 2 is a cross-sectional view illustrating the relative thicknesses of the materials in the destructive film.

Referring more particularly to FIGS. 1 and 2 a glass or ceramic substrate 10 is shown having a first film of tungstic oxide film 11 vacuum deposited thereon with an adjacent layer of aluminum film 12 vacuum deposited thereover. The tungstic oxide film can be evaporated from a 99.9 percent pure tungstic oxide powder and the aluminum film may be deposited from 99.99 percent pure aluminum wire heated and evaporated for depositing by vacuum on the substrate 10 in any well known manner to produce the molecular film adhesion or attraction to hold these films on the substrate. The tungstic oxide film 11 is evaporated to a thickness of about 1,500 angstroms, as shown more clearly in FIG. 2, while the thickness of evaporation depositing of the aluminum thereover is continued until the resistance of the aluminum is 0.5 ohms per square inch. Roughly the destructive film relation may be stated as $$TA \leq Tw \leq 1\tfrac{1}{2} TA.$$

While the description hereinabove is for first depositing the tungstic oxide film 11 on the substrate with the aluminum film 12 thereover, it is to be understood that these films may be placed on the substrate 10 in the reverse order with equally good results.

Over the destructive films 11–12 is vacuum deposited and electrically insulating film 13, such as a film of silicon monoxide, on which is vacuum deposited the electrical circuits as desired but herein shown for the purpose of illustration as being a nichrome resistor film 14 and a gold conductor film 15. The substrate 10 therefore produces thin film circuit module with a destructive film 11–12 thereon of aluminum and tungstic oxide in which the aluminum film 12 has external terminals to which is conducted a voltage source for activating the destructive film.

Figure 3:
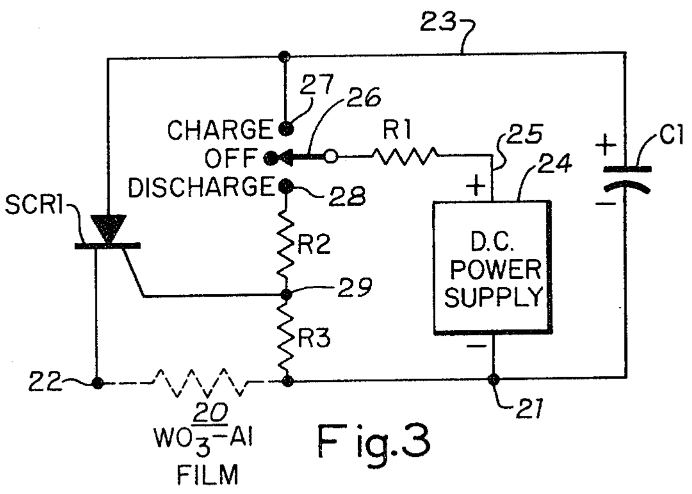
FIG. 3 is a circuit schematic partially in block connectable to the thin film destructive circuit.

Referring more particularly to FIG. 3 a circuit, illustrated herein for activating the destructive film shown to be the resistor 20, has one terminal coupled to a fixed or negative voltage terminal 21 and the other terminal 22 coupled to the cathode output of a silicon controlled rectifier, SCR1. The anode of the SCR1 is coupled by a conductor 23 to the positive plate of a storage capacitor C1, the opposite plate of which is coupled to the fixed or negative terminal 21. One terminal of a direct current (D.C.) voltage supply is coupled to the terminal 21, illustrated in block 24, and has a positive output 25 through a resistor R1 to the switch blade 26 of a three-position switch normally positioned on a center tap, being the "off" position. In the upper position of the switch blade 26 on the terminal 27 the D.C. power source 24 will be coupled to the conductor 23 to charge up the capacitor C1 in the range of 150 to 300 volts. A discharge terminal 28 for the switch 26 is through a resistor R2 and a resistor R3 in series to the negative terminal 21. The junction terminal of the resistors R2 and R3 is coupled to the gating terminal of the SCR1 such that when the switch blade 26 is positioned on terminal 28 the SCR1 will gate full storage voltage on capacitor C1 across the aluminum-tungstic oxide film causing a thermite reaction which will destroy the nichrome resistor film 14 and gold film 15 sufficiently to prevent any analysis duplication, or reconstruction of the thin film module. The films can be destroyed with about 2–4 joules of energy.

OPERATION

In the operation of the invention above described let it be assumed that a series of circuit modules of the type shown in FIG. 1 are assembled in a circuit panel to provide some function of missile guidance, radar detector, countermeasures, etc., as needed or required in the operation of electronic equipment. All of the aluminum-tungstic oxide destructive films 11 and 12 have their terminals coupled as shown by the resist-ance 20 in FIG. 3. Switch blade 26 of the circuit in FIG. 3 may be normally placed on terminal 27 to keep capacitor C1 charged such that any time it is necessary to destroy the circuitry, switch blade 26 is merely switched to the discharge terminal 28 which will cause a thermite reaction on the circuit module and destroy these electrical circuits beyond recognition or reconstruction.

While modifications may be made as by using other than the thin film circuit illustrated herein, it is to be understood that we desire to be limited in the spirit of our invention only by the scope of the appended claims.

We claim:

1. A self-destruct thin film circuit board comprising:
   a substrate providing an insulating board for a thin film circuit;
   deposited adjacent thin films of tungstic oxide and aluminum materials on said substrate;
   a thin film of electrical insulating material deposited over said thin films of tungstic oxide and aluminum;
   thin films of electrical circuits over said electrical insulating material providing a thin film circuit board; and
   an electrical switched circuit to a voltage supply coupled directly across said thin film of aluminum whereby switch closing of the electrical circuit will cause ignition of the tungstic oxide and aluminum films to destroy said thin films of electrical circuits.

2. A self-destruct thin film circuit as set forth in claim 1 wherein said tungstic oxide film is a thickness of about 1,500 angstroms and said aluminum is of a thickness to provide a resistance of about 0.5 ohms.

3. A self-destruct thin film circuit as set forth in claim 1 wherein said film deposit of said tungstic oxide to aluminum on a volumetric basis is from 1 to 1 to 1 ½ to 1.

4. A self-destruct thin film circuit as set forth in claim 1 wherein said tungstic oxide and aluminum thin films are deposited on a weight-to-weight basis of about 4 ½ to 1.

* * * * *